United States Patent
Wilson

(10) Patent No.: US 9,182,050 B2
(45) Date of Patent: Nov. 10, 2015

(54) PISTON CAP WITH CENTER VENT

(75) Inventor: John R. Wilson, Naperville, IL (US)

(73) Assignee: SLOAN VALVE COMPANY, Franklin Park, IL (US)

( * ) Notice: Subject to any disclaimer, the term of this patent is extended or adjusted under 35 U.S.C. 154(b) by 436 days.

(21) Appl. No.: 13/636,284

(22) PCT Filed: Mar. 30, 2011

(86) PCT No.: PCT/US2011/030589
§ 371 (c)(1),
(2), (4) Date: Sep. 20, 2012

(87) PCT Pub. No.: WO2011/123566
PCT Pub. Date: Oct. 6, 2011

(65) Prior Publication Data
US 2013/0008515 A1    Jan. 10, 2013

Related U.S. Application Data

(60) Provisional application No. 61/320,630, filed on Apr. 2, 2010.

(51) Int. Cl.
*F16K 31/383*    (2006.01)

(52) U.S. Cl.
CPC ....... *F16K 31/3835* (2013.01); *Y10T 137/0318* (2015.04)

(58) Field of Classification Search
CPC .................................................. F16K 31/3835
USPC ................................. 251/38, 39, 40
See application file for complete search history.

(56) References Cited

U.S. PATENT DOCUMENTS

| | | | |
|---|---|---|---|
| 822,116 A | 3/1906 | Grantland | |
| 1,932,002 A | 10/1933 | Tracy | |
| 2,369,104 A * | 2/1945 | Fredrickson | 251/237 |
| 2,470,925 A * | 5/1949 | Fredrickson | 277/438 |
| 3,729,167 A * | 4/1973 | Gulich | 251/39 |
| 4,261,545 A | 4/1981 | Allen | |
| 5,335,694 A | 8/1994 | Whiteside | |
| 6,550,744 B2 | 4/2003 | Nortier | |
| 6,913,239 B2 | 7/2005 | Nortier | |
| 6,926,247 B2 | 8/2005 | Nortier | |

(Continued)

FOREIGN PATENT DOCUMENTS

| | | | |
|---|---|---|---|
| JP | 2002/195444 | | 7/2002 |
| JP | 2002195444 A * | | 7/2002 |
| JP | 2003253724 A | | 9/2003 |

OTHER PUBLICATIONS

Office Action dated Jun. 23, 2014 for Spain Application No. P201290073, with translation, 10 pages.

(Continued)

*Primary Examiner* — Kevin Murphy
*Assistant Examiner* — Daphne M Barry
(74) *Attorney, Agent, or Firm* — Foley & Lardner LLP

(57) ABSTRACT

A flushometer having a cap with a substantially central exhaust passage adapted to remove air from the control chamber. The exhaust passage provides for communication between an upper pressure chamber and an interior piston chamber wherein during a flush cycle a portion of the contents of the upper pressure chamber is evacuated through the exhaust passage into the interior piston chamber and ultimately through the outlet of the flushometer.

13 Claims, 17 Drawing Sheets

(56) References Cited

U.S. PATENT DOCUMENTS

2005/0109965 A1* 5/2005 Nortier ................ 251/30.01
2007/0272887 A1 11/2007 Carroll et al.

OTHER PUBLICATIONS

Notification of the Second Office Action for Chinese Application No. 2014040101027910, dated Apr. 4, 2014, with English Translation, 18 pages.

Chinese office action for 201180017425.8 dated Aug. 2, 2013, 18 pages.

Search Report (Informe sobre el Estado de la Tecnica—IET), for Spain App. No. P201290073 dated Dec. 12, 2013, 8 pages.

International Search Report and Written Opinion for PCT/US2011/030589, mailed Dec. 27, 2011.

Office Action for Mexican Application No. MX/a/2012/010485, with English translation, dated Mar. 10, 2015, 8 pages.

* cited by examiner

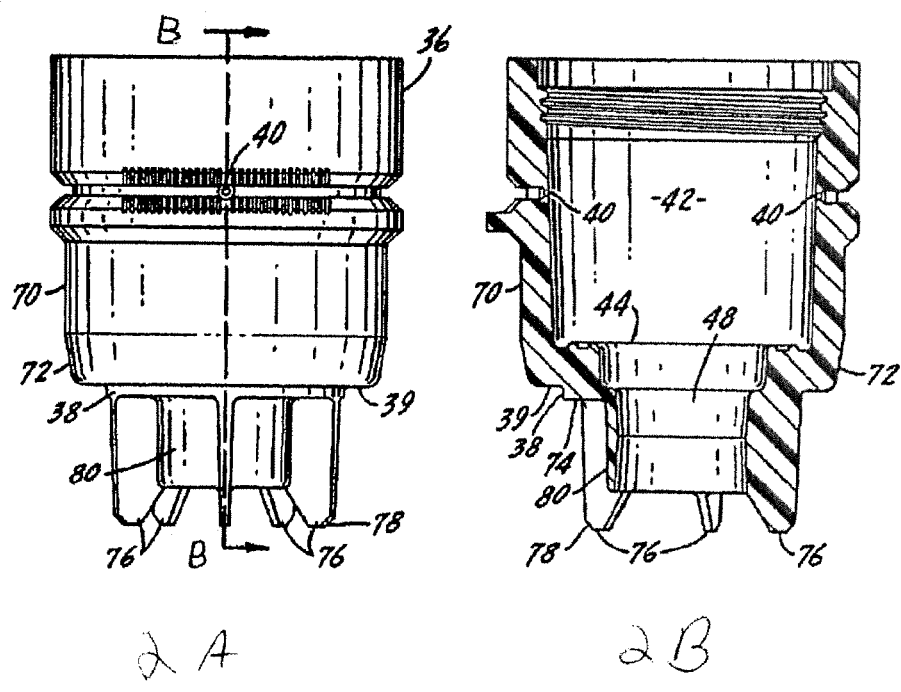

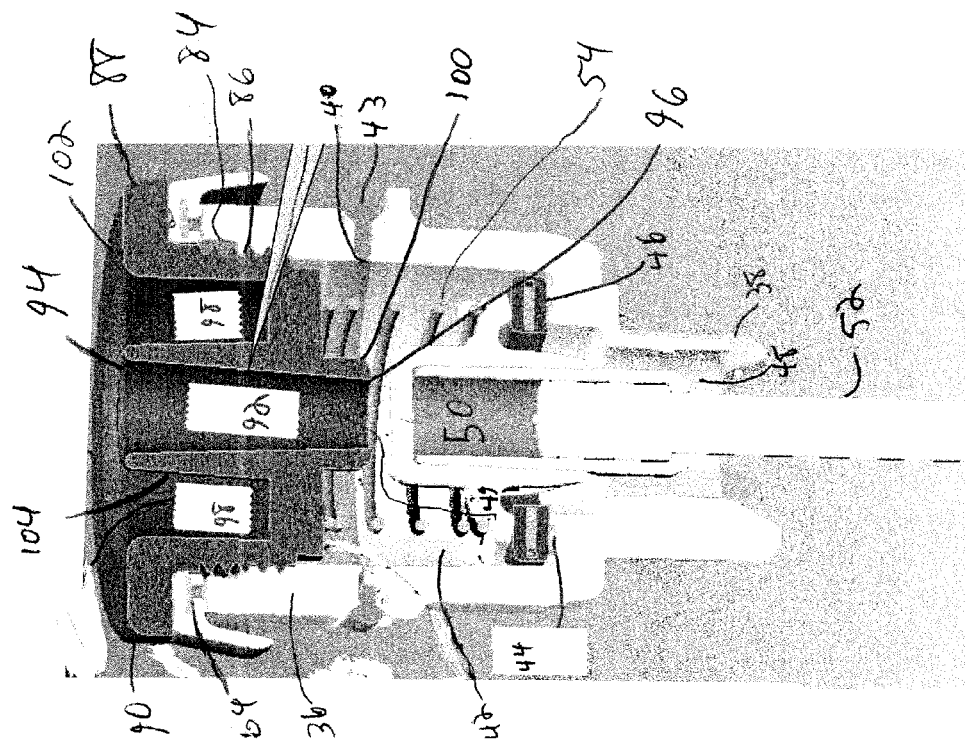

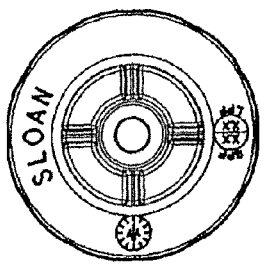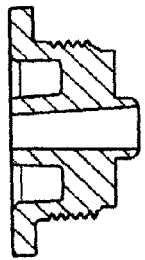
Figure 6G
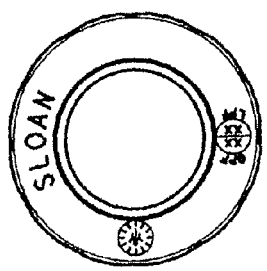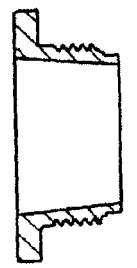
Figure 6F
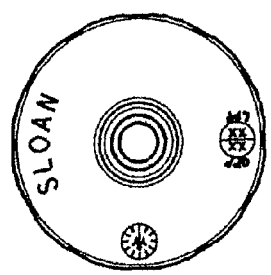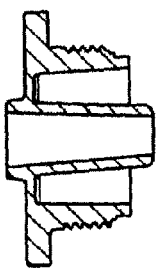
Figure 6E
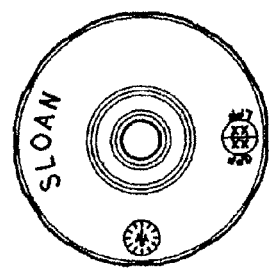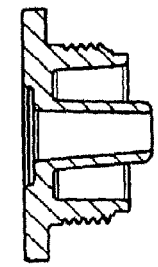
Figure 6D
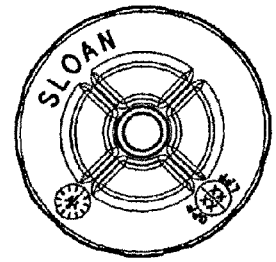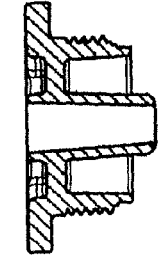
Figure 6C

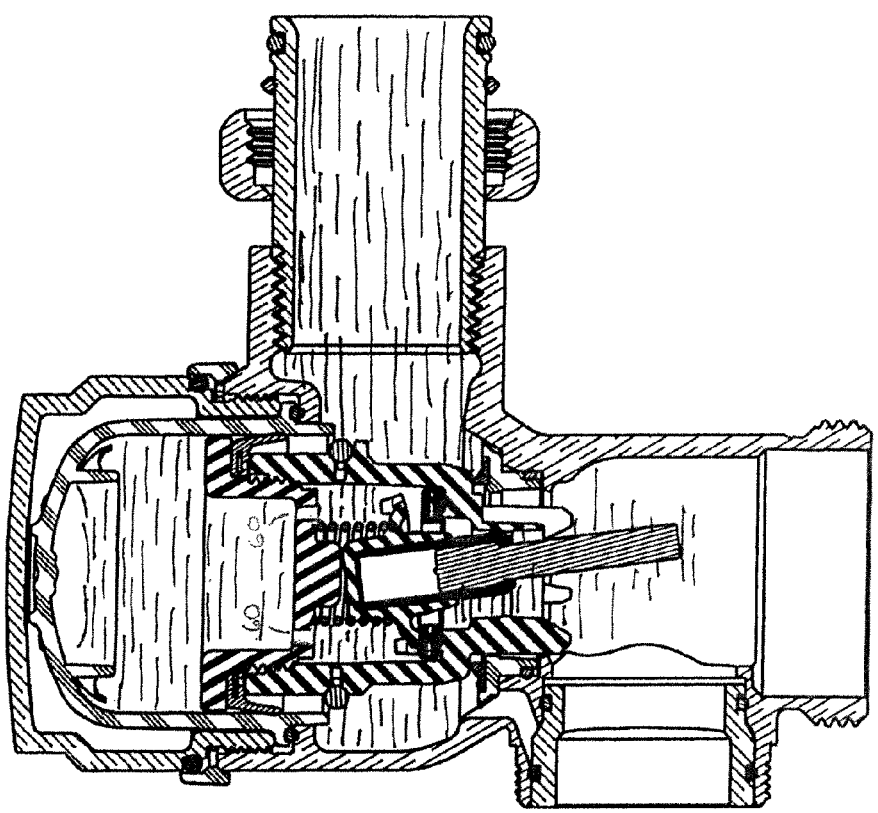

PISTON CAP WITH CENTER VENT

RELATED APPLICATIONS

The present application is a U.S. National Stage of International Application No. PCT/US2011/030589, filed 30 Mar. 2011, designating the United States, and claiming priority to U.S. Provisional Patent Application No. 61/320,630, filed 2 Apr. 2010, the contents of which are herein incorporated by reference in their entirety.

BACKGROUND OF THE INVENTION

This invention generally relates to a diaphragm or piston-type flushometer for use in a urinal, water closet, or the like. More particularly, the invention relates to a flushometer having a mechanism for removing air from a control chamber of the flushometer.

Piston-type flushometers having bypass orifice(s) are well known, as exemplified by the flush valve shown in U.S. Pat. No. 4,261,545, which is hereby incorporated herein by reference. Diaphragm-type flushometers also have bypass orifices, as exemplified by the flush valve shown in U.S. Pat. No. 6,616,119, which is hereby incorporated herein by reference. Another type of piston-type flushometer is taught, for example, in U.S. Pat. No. 6,913,239, which includes a domed inner cover defining the top of a control chamber. This type of piston valve has become commercially popular due to the benefits set forth in U.S. Pat. No. 6,913,239, namely that the inner cover allows for the outer cover to be made form a wider range of materials and also provides for improved reliability in operation of the flushometer.

Typically flushometers include a valve (piston or diaphragm) which seals the water inlet from the outlet of the valve body. The valve is controlled, at least in part, by utilizing pressure differentials, with a control chamber located within the valve body at its upper most interior. The control chamber functions to control the reseating of the valve upon the valve seat. An auxiliary valve controllably seals the control chamber from the outlet and bypasses provide metered control flow from the inlet to the control chamber. Thus, the control chamber can be pressurized to substantially the pressure of the inlet via communication through the bypasses. As the line pressure in the control chamber acts on a larger topside area of the piston or diaphragm than the inlet line pressure acts on smaller underside area of the piston, the valve remains closed under equal pressures. When the auxiliary valve is opened, the control chamber becomes exposed to a lower pressure (typically atmospheric pressure), i.e., smaller force, and the contents of the control chamber are vented into the outlet reducing the force exerted on the piston and allowing it to raise off the main seat creating an opening so that water from the inlet may flow to the outlet. The control chamber is repressurized via the bypass(s) and the valve closes as the force in the control chamber on the piston top increases past the force pushing on the underside of the piston body.

In ideal operation, the flushometer contains only water fluid within the inlet, valve, and control chamber, i.e. there is not air in the flush valve, such that water completely fills the volume. However, in certain circumstances, such as when the valve assembly is first installed, following maintenance, or where the water supply contains excessive dissolved gases (such as air), gases may be present in the valve assembly. More particularly, the gases will typically be located in the upper most interior of the valve assembly that is in fluid communication with the inlet, which is typically (see FIG. 1A and FIG. 1B) the control chamber. In particular, for commercial flushometers utilizing the domed inner cover taught by U.S. Pat. No. 6,913,239, the gases will have a tendency to be located at the top of the domed inner cover. Thus, gas may reside in the control chamber in such situations.

When air (gas) is present in the control chamber, the gallons per flush (GPF) will differ from the GPF when only water is present in the control chamber. The compressible "fluid" air combines with the incompressible fluid water causing inconsistent volume in the critical control chamber. A certain amount of the air will dissolve in the water and be removed over time, along with the water during repeated flush cycles. In prior art devices, this phenomenon results in a small amount of the air being removed each flush cycle, effectuating removal of the air (and a return to the "normal" GPF for a control chamber with only water) over a large number of flush cycles, understood to be over 50 cycles for some devices.

SUMMARY OF THE INVENTION

One embodiment of the invention relates to a flushometer having a cap with a substantially central exhaust passage configured to remove air from the upper pressure chamber.

In one embodiment, the invention related to a flush valve system. The flush valve system comprises a hollow valve body having an inlet, an outlet, and a valve seat therebetween. The system further includes a piston assembly movable within the hollow valve body and configured to seat upon the valve seat to seal the inlet from the outlet. An upper pressure chamber is positioned above the valve member within the hollow valve body. The piston assembly includes a piston, having an interior piston chamber, and a cap having a cylindrical body with a cylindrical lip atop the body and having a larger diameter The cap includes an exhaust passage therethrough the lip and body providing communication between the upper pressure chamber and the interior piston chamber, the exhaust passage being positioned substantially in the center of the cap.

In one embodiment, the invention relates to a piston cap for a piston-type flushometer. The piston cap has a cylindrical body having an exterior threaded sidewall and a lip portion. The lip portion has a larger diameter than the body and is positioned on top of the cylindrical body. The cap includes an exhaust passage therethrough and an upper pressure chamber opening and a piston interior chamber opening. The exhaust passage is substantially centered about a central axis of the cap. At least one recessed area is positioned between an upper annular protrusion of the body defining at least a portion of the exhaust passage. The upper pressure chamber opening is larger than the lower chamber piston opening.

In one embodiment, the invention relates to a method of evacuating gas, such as air, from a piston valve control chamber. A piston valve has a piston assembly adapted to reciprocate within a body of the flush valve and further comprising a hollow, generally cylindrical piston defining a piston interior chamber, sealed from an outlet by a relief valve, the piston assembly further having a control chamber positioned above the piston valve. The method comprising providing a piston cap having a central located exhaust passage, the exhaust passage providing fluid communication between the control chamber and the piston interior chamber. The relief valve is actuated, placing the piston interior chamber in fluid communication with the outlet. A low pressure location is formed at a location within the exhaust passage. The piston assembly is moved upward, reducing the volume of the control chamber. Gas is moved in the control chamber to the low pressure location. Gas is evacuated from the control chamber through the exhaust passage. Water is moved in the control chamber to the low pressure location. The water is evacuated from the control chamber through the exhaust passage and the relief valve is closed. The control chamber refills with water from an inlet and contains substantially less air than prior to evacuation of the gas.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2A is an side view of a piston of the prior art device of FIG. 1A; FIG. 2B is a vertical cross-section along line B-B of the piston of FIG. 2A;

FIG. 4B is a vertical section through a piston assembly in accordance with one embodiment of the present invention;

FIGS. 6A-F illustrate vertical sections of various embodiments of a piston cap; FIG. 6A having a relatively shallow recess; FIG. 6B having a relatively deep recess; FIG. 6C lacking a recess; FIG. 6D having an exhaust passage that terminates at a position below the upper surface of the cap; FIG. 6E having an exhaust passage that terminates at a position above the upper surface of the cap; FIG. 6F having an exhaust passage that is substantially cylindrical, i.e. with substantially parallel sidewalls such that the control chamber cap opening is substantially the same size as the piston interior chamber cap opening; FIG. 6G having an exhaust passage that has nonparallel sides such that the control chamber cap opening is smaller than the piston interior chamber cap opening;

FIG. 8B illustrates an interior of a piston valve just after the relief valve is tilted and the piston starts to rise.

DETAILED DESCRIPTION OF THE PREFERRED EMBODIMENTS

Figure 1A:
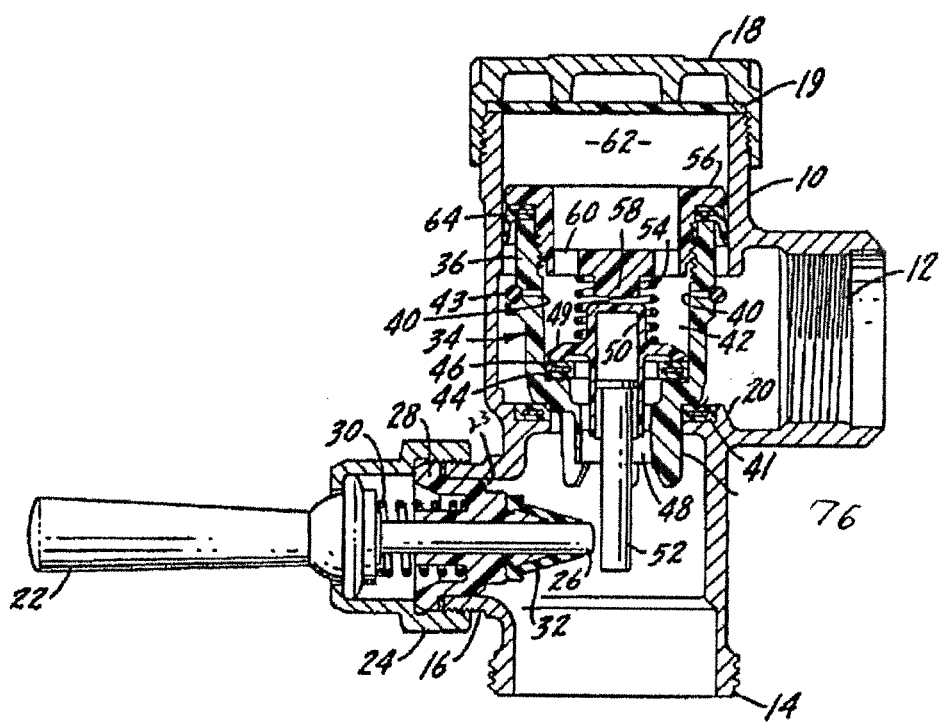
FIG. 1A is a vertical section through a flushometer illustrating a prior art piston design.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It be readily understood that the aspects of the present disclosure, as generally described herein, and illustrated in the figures, can be arranged, substituted, combined, and designed in a wide variety of different configurations, all of which are explicitly contemplated and made part of this disclosure.

The piston assembly 34 of the present invention is conventionally used with flushometer assemblies for urinals or water closets. The flushometer piston 34 is designed to control the flow of water through the flushometer to provide a specific quantity of water for each flushing operation, with the water passing through the flushometer at a high flow rate even when the water pressure is on the low side of the range of water pressures commonly found in commercial fixtures in the United States. Although the invention will be described in which the desired volume per flush is 1.6 gallons or six liters, it should be understood that the size of the various parts, such as the size of the bypass, may be modified to provide different volumes of water per flush.

Figure 1B:
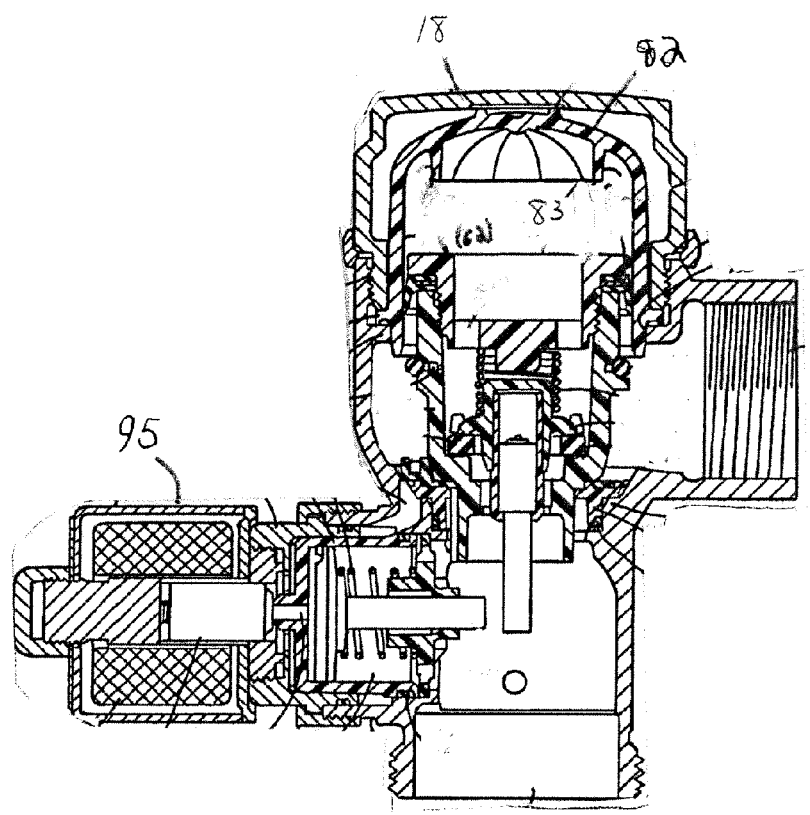
FIG. 1B is a vertical section through an alternative prior art piston flushometer having a control chamber with a domed inner cover.
Figure 4A:
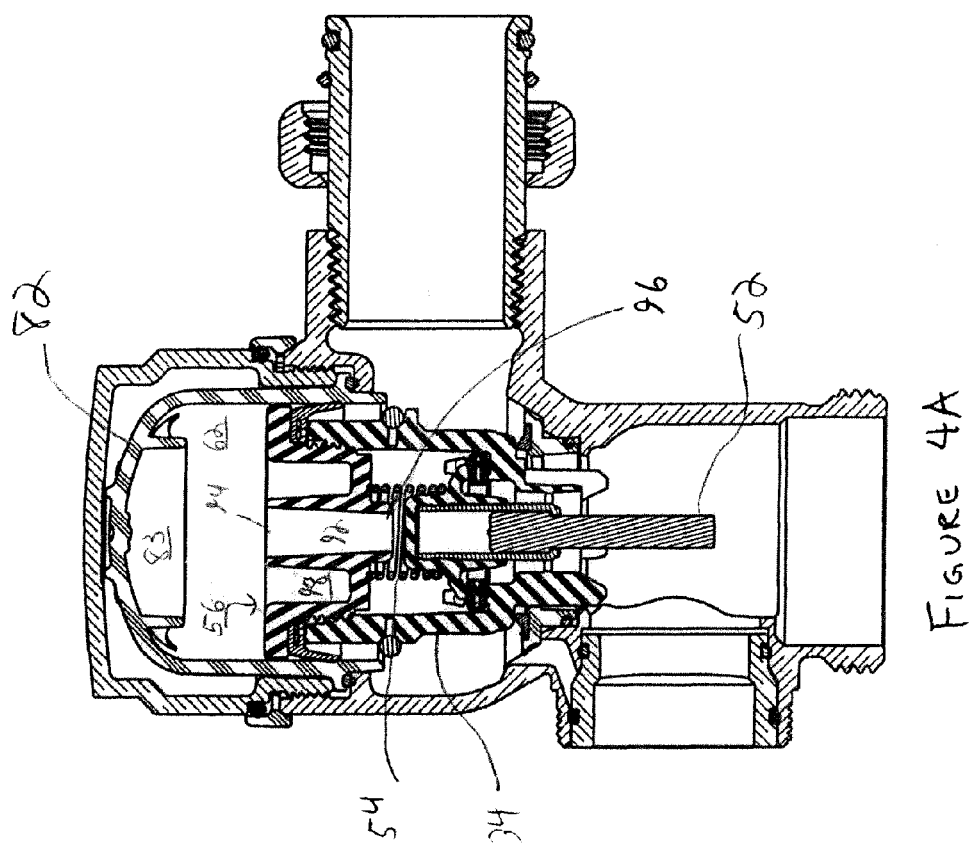
FIG. 4A is a vertical section through a piston-type flushometer in accordance with one embodiment of the present invention.
Figure 5A:
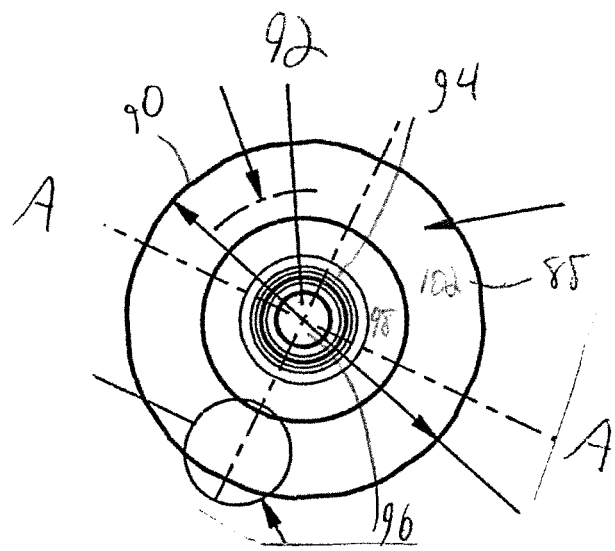
FIG. 5A is a top view of one embodiment of a piston cap of the present invention.
Figure 5B:
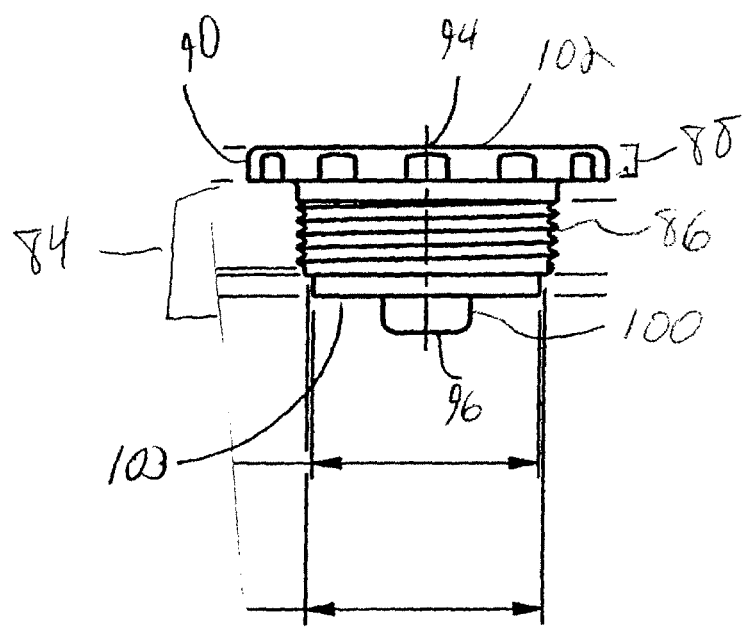
FIG. 5B illustrates a side view of the cap.

FIGS. 1A and 1B generally show the structure of prior art piston-type flushometers, while FIG. 4A illustrates a piston-type flushometer of the present invention. The flushometer as shown has a generally hollow valve body 10 which includes an inlet connection 12, an outlet connection 14, and a handle coupling connection 16. The top of the valve body 10 is closed by a cover 18 and there may be a seal element 19 between the cover and the body. In an alternative embodiment, shown in FIG. 1B an inner domed cover 82 is provided between the cover 18 and the cap 56. A main valve seat 20 is formed on the interior walls of the body 10. The valve is actuated by an operating handle 22 which is fastened to the valve body 10 by means of a coupling nut 24. The handle 22 is connected to a plunger 26 which extends to the interior portion of the valve body 10. The plunger 26 is guided and supported by a bushing 28 and is restored by a spring 30. A rubber packing 32 is snapped on the end of bushing 28 and prevents leakage outwardly from the handle opening 23 due to the sliding plunger 26. The FIG. 1A valve as shown has a manual handle 22 for operation. The present invention is equally adaptable to automatic operation, for example using an automatic actuation mechanism 95, one embodiment of which is shown in FIG. 1B.

With continued reference to FIGS. 1A, 1B, and 4A, a piston assembly 34 is adapted to reciprocate within the body 10. The piston assembly 34 includes a hollow, generally cylindrical piston 36. The piston 36 has a lower cylindrical extension 38 which is directly adjacent a piston seat area 39, with the piston seat area 39 being normally seated upon a seal member 41 to close the main valve seat 20 and to thereby control the flow of water through the flushometer.

With reference to FIGS. 2A and 2B, the piston 36 is shown. The piston 36 has a pair of bypass orifices 40 (alternatively only a single bypass or more than two bypasses may be utilized), which may be utilized in combination with a filter ring 43 (FIG. 1A), which ring 43 functions according to known principles for providing additional anti-clogging properties (see, e.g., U.S. Pat. No. 4,261,545. The piston interior chamber 42 of the piston 36 has an annular ledge 44 supporting a seal 46. The ledge and seal are at the top of a central passage 48 which connects piston interior chamber 42 with the outlet side of the flushometer at the outlet connection 14.

The piston assembly 34 also includes a relief valve 50 which normally closes passage 48 of the piston 36. The relief valve has a collar 49 which engages the seal 46 on the annular ledge of the piston. An operating stem 52 is slidable in the central hollow portion of the relief valve 50 and extends to a point adjacent plunger 26. A spring 54 assists in holding the relief valve 50 in its position to close and seal piston interior chamber 42.

The piston assembly 34 further includes the cap 56 threadably engaging the upper wall of piston 36. The spring 54 abuts against the cap 56 at one end and the collar 49. A lip seal 64 held between the cap 56 and piston 36 provides a slidable seal separating the pressure chamber 62 from inlet water pressure.

The piston 36 has a cylindrical wall 70 which is preferably smooth and unobstructed. Directly adjacent the cylindrical wall 70 is a tapered piston area 72 which may have a taper of on the order of about ten degrees, which taper is effective to provide a clear flow path about the piston when it is in the raised position away from the valve seat 20. Directly adjacent the tapered area 72 is the piston seat area 39 which will close upon the main seat 20 when the valve is in the closed position. Directly downstream of the piston seat area 39 is a ring 74 which has an outer diameter slightly less than the diameter of the valve outlet adjacent the seat 20 so that ring area 74 will be inside of the valve seat when the piston is closed. The ring 74 functions as a throttling means in that it substantially reduces flow through the valve outlet just prior to complete valve closure.

Directly adjacent the throttling ring 74 is the lower cylindrical portion 38 of the piston 36 which has a plurality of radially and axially extending ribs 76, in one embodiment generally circumferentially uniformly spaced ribs. The outer diameter of the ribs is less than wall 70 and just slightly less than the passage through seat 20. The ribs are thus inside of the major portion of the piston so as not to restrict flow. In a preferred embodiment five ribs 76 are provided for maximizing stability and guidance for the piston, without detrimentally obstructing water flow past the piston when the piston is in the valve open position. In one embodiment, the ribs 76 define a fixed flow area as they move through the piston seat area 39 transitioning the water flow from main flow to low flow as shut off. At the lower end of each of the axially extending ribs there is a chamfered area 78 which assists in assembling the piston within the flushometer assembly.

The area between each of the ribs 76 is closed by a skirt 80. As shown, the skirt 80 has a radius slightly less than the exterior surface of the ribs 76. The function of the skirt 80 is to close the area between ribs to provide control of water flow past the piston, which in turn will provide a more consistent operation of the flushometer. The skirt 80 improves the flow path by maintaining it in an axial direction generally circumferentially about the lower cylindrical portion 38. By preventing water flow into the water passage 48, the skirt 80 also helps prevent any back pressure which might retard closure of the relief valve. The skirt area 80 terminates short of the downstream end of each of the ribs 76.

Figure 3A:
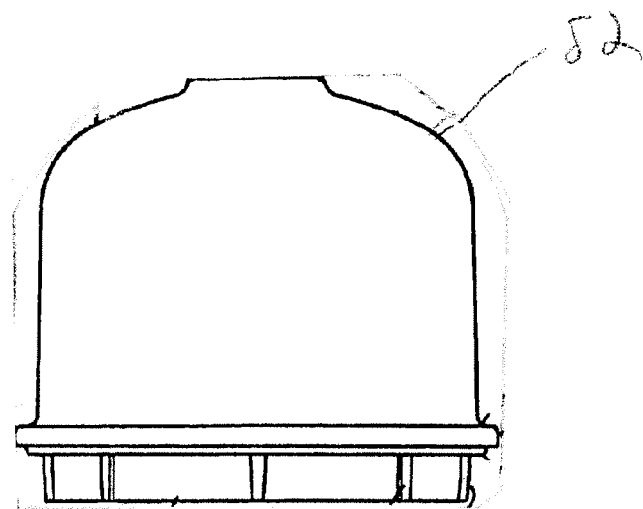
FIG. 3A illustrates a domed inner cover for placement between the cap and the outer cover of the valve body.
Figure 3B:
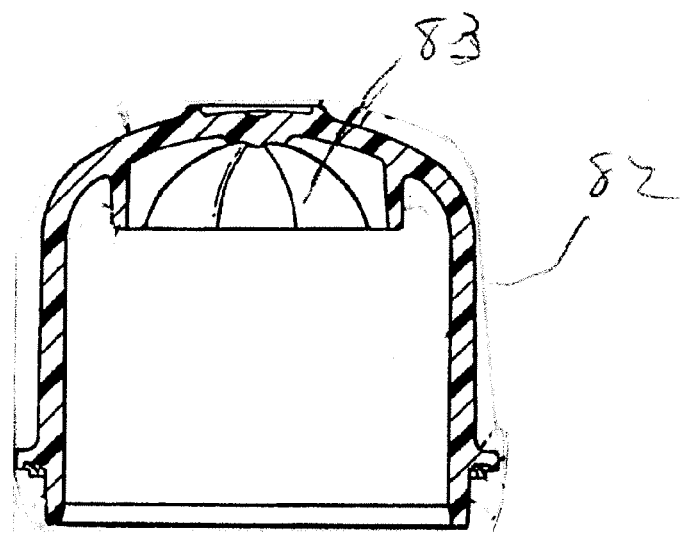
FIG. 3B is a vertical section of the domed cover of FIG. 3A.

As described above, in certain embodiments a domed cover 82 is provided to define the upper pressure chamber 62. FIGS. 3A and 3B illustrate an embodiment of a domed cover 82. As can be seen in FIG. 3B, the domed cover 82 may include an inner domed cover chamber 83 that defines a volume at the top of the upper pressure chamber 62 and that is open to the upper pressure chamber 62. As described in the U.S. Pat. No. 6,913,239, this structure of the domed cover 82 may provide additional strength to resist forces. It should be appreciated that while some of the figures illustrate an embodiment of a flush valve having a domed cover 82 including an inner chamber 83, such structure is not necessary for the described central exhaust passage to function to evacuate air as described herein.

In one embodiment the present invention provides a cap 56 configured to allow passage of fluid from the upper pressure chamber 62. The cap 56 also interacts with the domed cover 82, or the valve body 10 such as in structures as shown in FIG. 1A, to control the movement of the piston assembly 34 and also servers, in certain embodiments, to retain the spring 54 that biases the relief valve 50. Prior caps 56 included a variety of peripheral openings 60 disposed about an interior periphery of the cap 56 The positioning of the holes afforded a uniform pressure gradient as the pressure exerts force on the upper surface of the piston. FIG. 4A through FIG. 7 illustrate various embodiments of the cap 56 of the present invention. With reference to FIGS. 4A and 4B, the cap 56 is configured to engage the piston such that a portion of the cap 56 is disposed within the piston 34 and with a portion remaining outside the piston 36 and substantially covering a top surface of the piston. The cap 56 includes a body portion 84 of a first circumference disposable within the piston 36 and, in one embodiment, including a threaded sidewall 86 for engaging threads on the interior of the cylindrical wall 70 of the piston 36. As can be seen best in FIG. 4B and FIGS. 5A and 5B, the cap 56 further includes a lip portion 88 that has a circumference greater than that of the body 84 and substantially forms the top side 102 of the piston 36. The cap 56 further includes an exhaust passage 92 that defines a passage through the cap 56, the passage having an upper pressure chamber opening 94 and a piston interior chamber opening 96. The exhaust passage 92 provides fluid communication between the piston interior chamber 42 and the upper pressure chamber 62. In one embodiment, a periphery 90 of the lip includes a plurality of straight segments configured to impart a bearing functionality to the cap n regard to interaction with the domed cover 82.

In one embodiment, the cap 56 includes a recessed area 98 circumscribing the exhaust passage 92 and extending from the lip 88 into the body portion 84. The recessed area 98 may not be continuous about the exhaust passage 92. For example, in one non-limiting embodiment, the recessed area 98 is interrupted by four walls 95 connecting the exhaust passage 92 to a portion of the cap 56 (best illustrated in FIGS. 6C and 6G). These s and they act as driving lugs for torqueing the cap onto the piston body. e presence or absence of the recess 98 and the depth of the recess 98 may be varied without departing from the spirit and scope of the invention. While the figures generally show the recess 98 extending substantially through the cap 56, FIG. 6A illustrates an embodiment with a shallow recess 98, FIG. 6B illustrates an embodiment with a deep recess 98 and FIG. 6C illustrates an embodiment where no recess 98 is present.

Figure 6A:
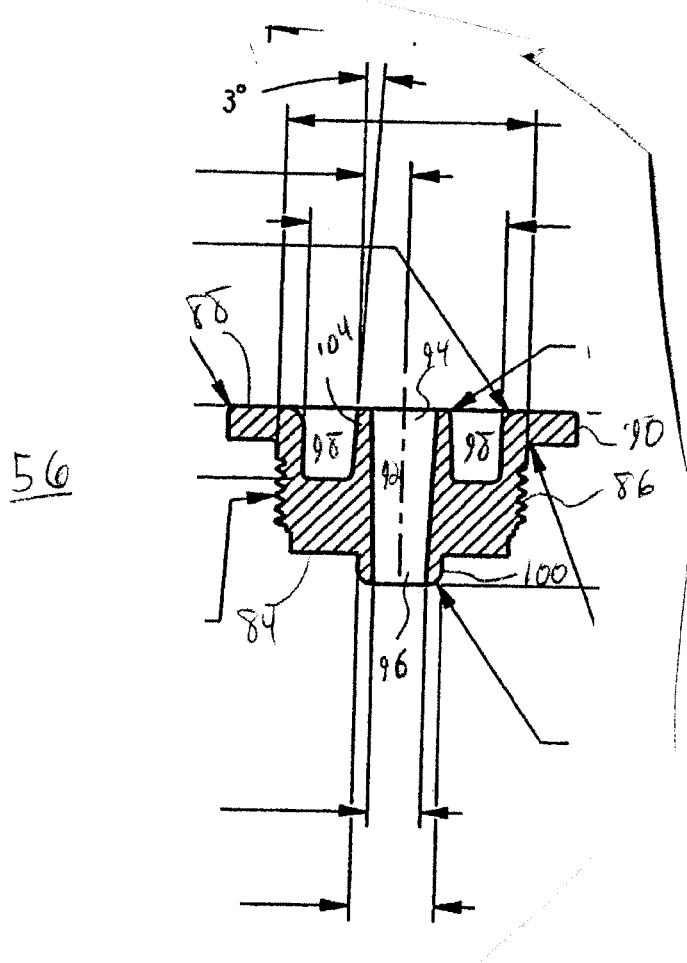
Figure 6B:
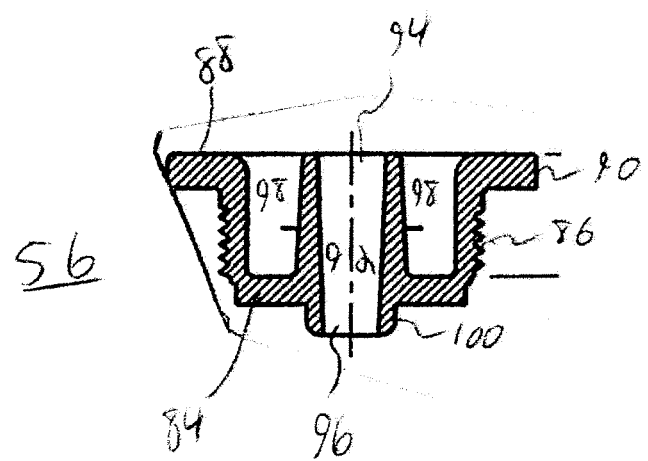

In such an embodiment, as shown in FIGS. 6A-B, the exhaust passage 92 includes a upper annular protrusion 104 that extends from within the recess 98 of the cap 56 towards the top side 102 of the cap 56. In one embodiment, as can be seen in FIG. 6A, the upper protrusion 104 extends to substantially a plane defined by the top side 102. In another embodiment shown in FIG. 6D, the upper protrusion 104 extends from the recess 98 but not sufficiently to extend beyond the top side 102, whereby the entire upper protrusion 104 is disposed within the recess 98. In another embodiment illustrated in FIG. 6E, such as for flushometers with a shorter stroke that does not place the cap 56 in close proximity to the interior portion of the crown, the protrusion extends beyond the plane of the top side of the cap 56. In one embodiment, the upper protrusion 104 may include one or more separate structures providing for an extension of the protrusion beyond the top side of the cap 56. Alternatively, the upper protrusion 104 may be a single component, including a component integral to the cap 56, such as where the entire structure is a single molded structure.

In one embodiment, as shown in FIG. 6A, the exhaust passage 92 extends into the piston interior chamber 42 to form a lower annular protrusion on the bottom of the cap 56. The lower annular protrusion 100 may be configured to retain the spring 54 such as by extending into the piston interior chamber 42 such that the lower annular protrusion 100 is partially disposed within an upper portion of the spring. In such an embodiment, the lower annular protrusion 100 functions as a spring guide. In an alternative embodiment illustrated in FIG. 6H, an annular groove 106 is provided on the bottom surface 103 of the cap 56, the annular groove 106 configured to receive a portion of the spring.

The exhaust passage 92 may include a symmetrical shape such as a cylinder, wherein the piston interior chamber opening 96 and the upper pressure chamber opening 94 openings are substantially of equal size, such as illustrated in FIG. 6F. In another embodiment, one of the piston interior chamber opening 96 and the upper pressure chamber opening 94 is larger than the other with the passage tapering between the two, such as to form a truncated cone. FIG. 6A illustrates an embodiment where the upper pressure chamber opening 94 has a greater circumference than the piston interior chamber opening 96. As a result of this shape of the exhaust passage 92, the point of lowest pressure in the passage during a flush event is adjacent the piston interior chamber opening 96. It should be appreciated that it is to the low pressure point that the contents of the upper pressure chamber 62, notably the air, will travel. In an alternative embodiment shown in FIG. 6G, the upper pressure chamber opening 94 has a circumference less than that of the piston interior chamber opening 96. This embodiment results in a lowest pressure point being adjacent the upper pressure chamber opening 94.

Figure 7A:
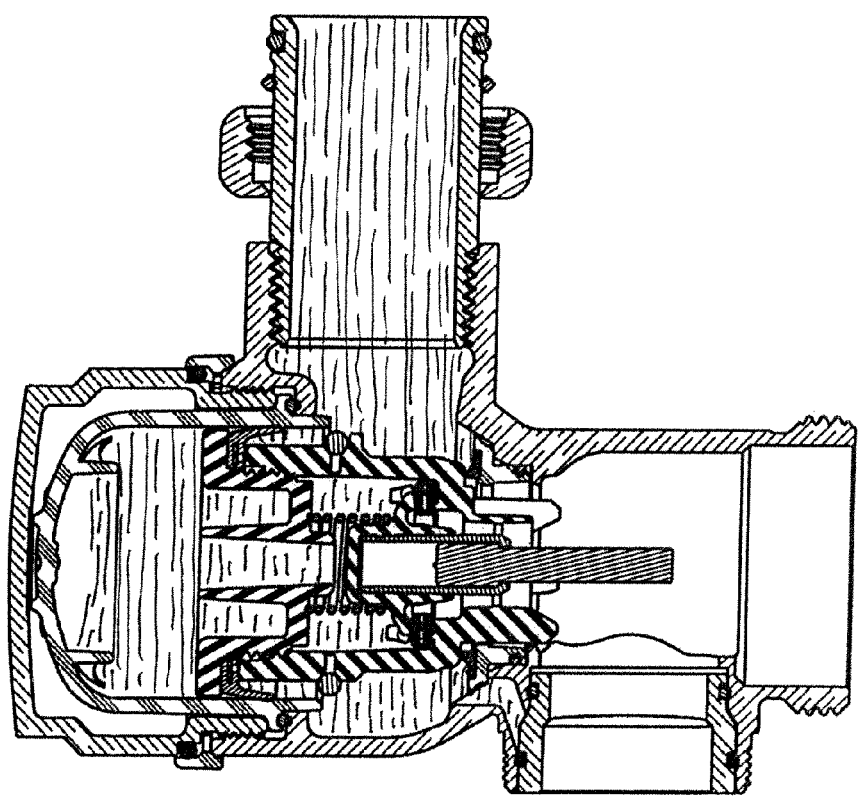
FIG. 7 a illustrates an interior of a piston valve having a central exhaust passage, just prior to activation.
FIG. 7b illustrates an interior of the piston valve just after the relief valve is tilted and the piston starts to rise.
FIG. 7C illustrates an interior of the piston valve at full stroke with full flow and excess air being expelled from the control chamber.
Figure 7B:
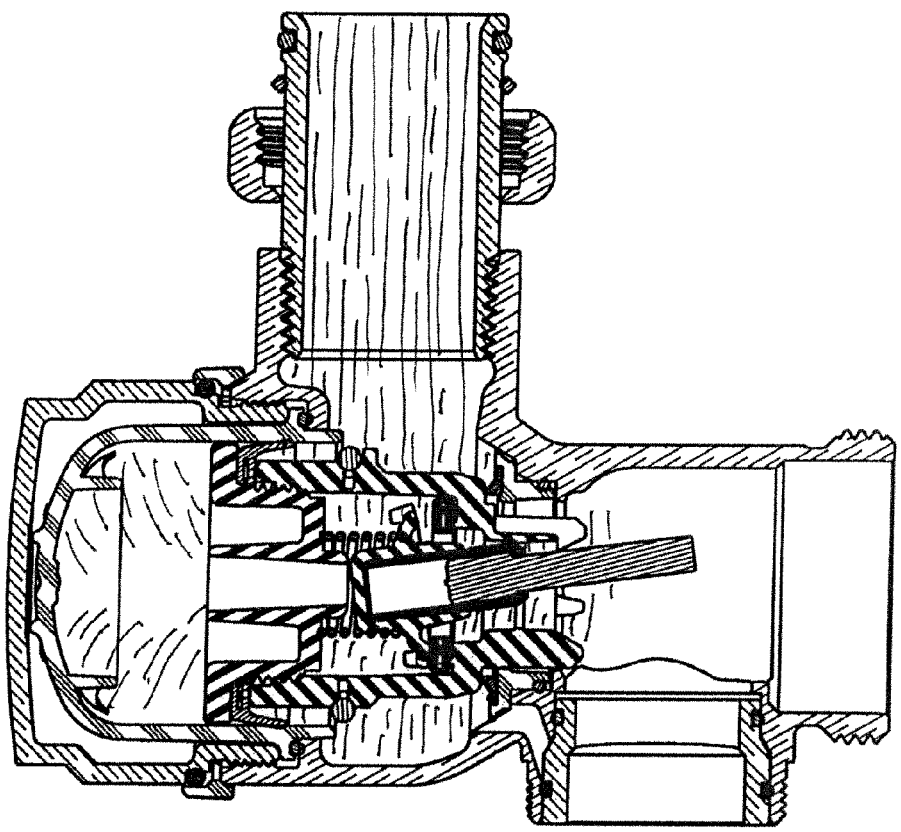
Figure 7C:
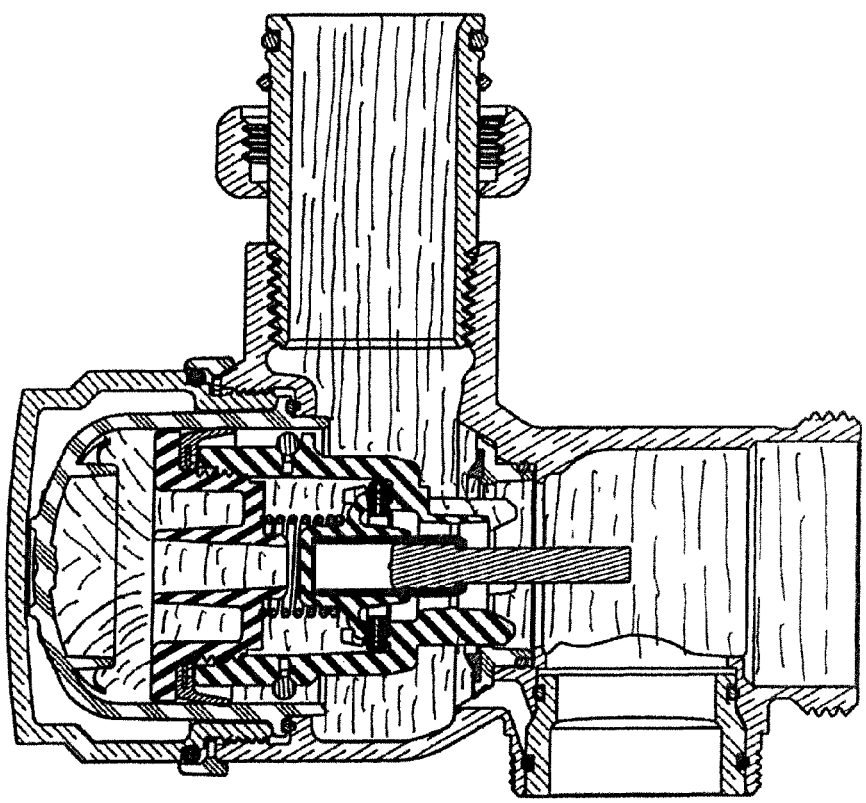

During operation of a flush cycle, when the relief valve 50 is open by activating the handle 22 of the flush valve, this center exhaust passage 92 of the piston cap 56 is at the same pressure as the valve body outlet 14, normally atmospheric pressure (zero PSI). The air above the piston assembly 34 is still compressed to the static water pressure of the inlet water supply. This compressed air pocket quickly expands towards the center exhaust passage 92, which has a lower pressure than the air pocket and water in the upper pressure chamber 62. This compressed air pocket is quickly forced through the momentary open aux-valve and is discharged through the valve body outlet 14. Water then replaces the volume formerly occupied by the exhausted air as the upper pressure chamber 62 refills via the bypasses 40 in the piston 36. FIG. 7 illustrates the movement of the air pocket as described. As can be seen, the air pocket moves towards the low pressure of the exhaust passage 92. At the same time, the entire piston assembly 34 is moving upwards, reducing the total volume of the upper pressure chamber 62. This along with the low pressure of the exhaust passage 92 causes the water to move within the upper pressure chamber 62. Thus, in certain embodiments, the water around the periphery of the upper pressure chamber 62 rises as the air pocket deforms towards the exhaust passage 92. The location of the air passage protrusion at the top side of the cap 56 allows the air pocket reach the exhaust passage 92 prior to the water overtaking the air pocket and preventing it from being removed.

Figure 8A:
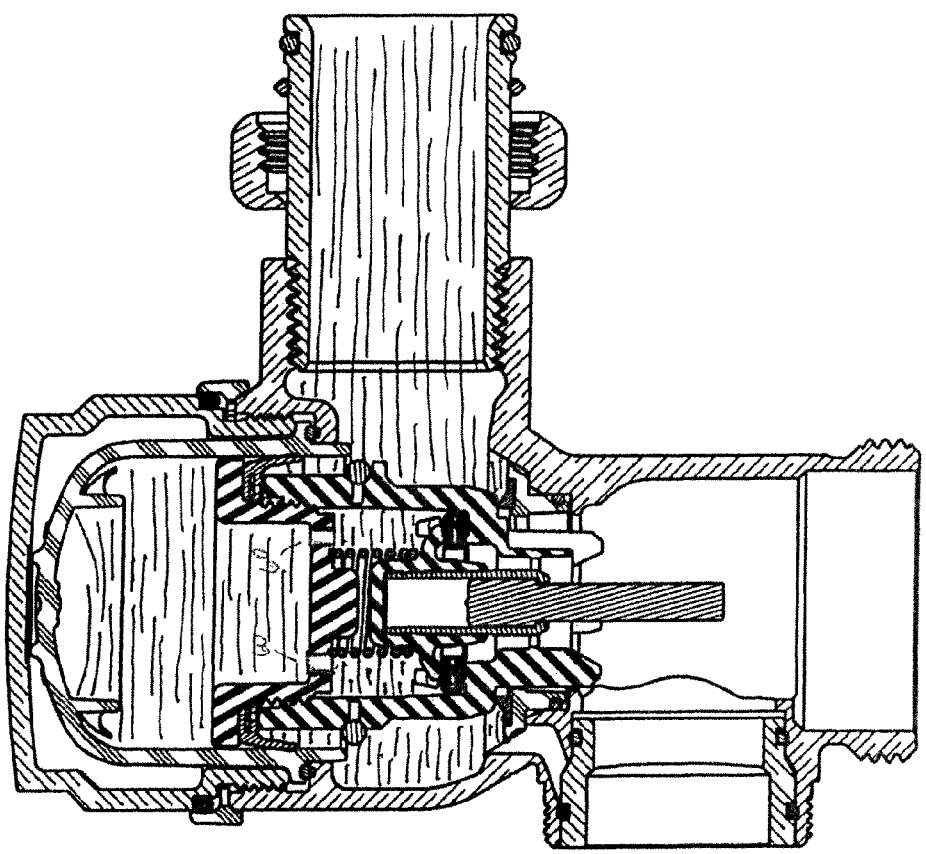
FIG. 8A illustrates an interior of a piston valve, lacking the central exhaust passage, just prior to activation.
Figure 8C:
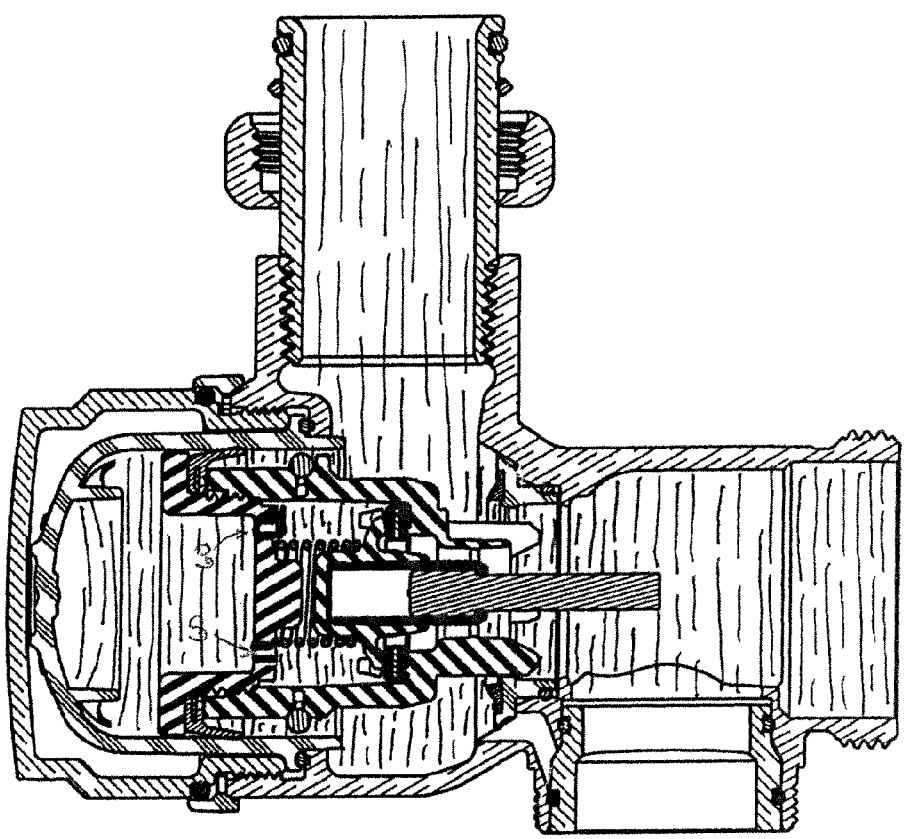
FIG. 8C illustrates an interior of the piston valve at full stroke with full flow and excess air trapped within the control chamber.

In contrast, FIG. 8 illustrates prior art piston valves lacking the described exhaust passage 92. While the air pocket deforms slightly, it does not come in contact within the recess 98 of the cap 56. Thus, the air pocket is not evacuated as described.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An flush valve system comprising:
   a hollow valve body having an inlet, an outlet, and a valve seat therebetween;
   a piston assembly movable within the hollow valve body and configured to seat upon the valve seat to seal the inlet from the outlet;
   an upper pressure chamber positioned above the piston assembly within the hollow valve body;
   the piston assembly including a piston, having a piston interior chamber, and a cap;
   the cap including a body portion having a sidewall and a lip extending annularly from the sidewall, the cap further including an upper annular protrusion from the body defining a recess in the body between the sidewall and the upper annular protrusion and further defining an exhaust passage therethrough the lip and the body providing communication between the upper pressure chamber and the piston interior chamber, the exhaust passage being positioned substantially in the center of the cap;
   the exhaust passage having an upper pressure chamber opening and a piston interior chamber opening wherein the upper pressure chamber opening is larger than the piston interior chamber opening.

2. The flush valve system of claim 1, wherein the exhaust passage extends above a plane defined by a top side of the cap.

3. The flush valve system of claim 1, wherein the exhaust passage extends below a plane defined by a bottom side of the cap.

4. The flush valve system of claim 1, wherein the exhaust passage terminates below a plane defined by a top side of the cap.

5. The flush valve system of claim 1, wherein the cap includes a recessed groove on a bottom surface, the recessed groove circumscribed about the exhaust passage.

6. The flush valve system of claim 1, wherein the recess extends the thickness of the lip.

7. The flush valve system of claim 1, wherein the recess extends substantially into the body.

8. A piston cap for a piston-type flushometer, comprising:
   a cap comprising a cylindrical body having an exterior threaded sidewall and a lip portion having a larger diameter than the cylindrical body and positioned on top of the cylindrical body;

the cap including an exhaust passage therethrough, having an upper pressure chamber opening and a piston interior chamber opening, the exhaust passage substantially centered about a central axis of the cap;

at least one recessed area positioned between an upper annular protrusion of the body defining at least a portion of the exhaust passage;

wherein the upper pressure chamber opening is larger than the lower chamber piston opening.

9. The piston cap of claim 8 wherein the upper annular protrusion extends above a plane defined by the lip.

10. The piston cap of claim 8 further comprising a lower annular protrusion extending from the body and defining at least a portion of the exhaust passage and the piston interior chamber opening.

11. The piston cap of claim 10, wherein the lower annular protrusion extends below a plane defined by a bottom surface of the body.

12. The piston cap of claim 11, further comprising an annular groove on the bottom surface of the body, wherein the annular groove is configured to receive a portion of a spring.

13. The piston cap of claim 12, wherein the annular groove is circumscribed about the lower annular protrusion.

* * * * *